Jan. 1, 1929.
R. T. MURRAY ET AL
1,697,078
STORAGE BATTERY PLATE
Filed Dec. 5, 1927
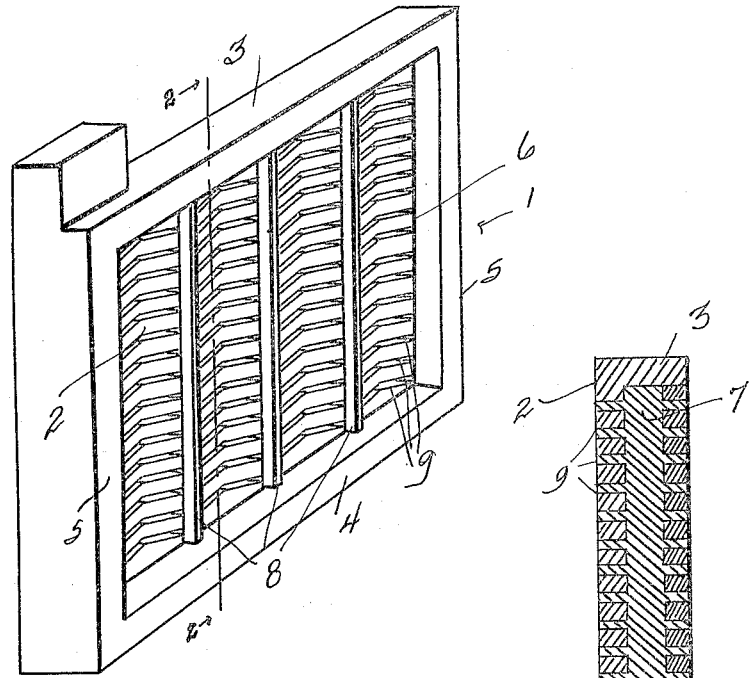
FIG-1-
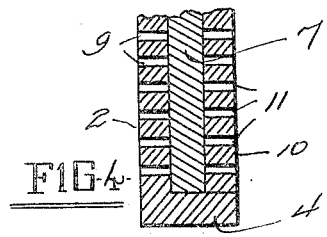
FIG-2-
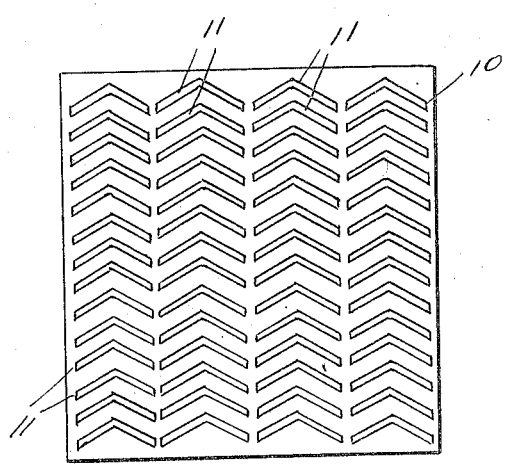
FIG-3-
FIG-4-
INVENTORS,
RAYMOND T. MURRAY
AND FRANK M. KELLY
BY *Warner J. Cutberley*
ATTORNEY.

Patented Jan. 1, 1929.

1,697,078

UNITED STATES PATENT OFFICE.

RAYMOND T. MURRAY AND FRANK M. KELLY, OF INDIANAPOLIS, INDIANA.

STORAGE-BATTERY PLATE.

Application filed December 5, 1927. Serial No. 237,322.

Our present invention, in its broad aspect, has reference to improvements in storage battery plates wherein the front and back of the plate are formed in sections, one section having flanges along its edges to provide a chamber for receiving active material, as for instance lead oxide, and the other section being carried between and attached to the flanges to provide a cover; and both sections being slotted to provide access of the electrolyte to the lead oxide or other filler. More particularly it is our purpose to provide a storage battery plate wherein shedding of the filler of active material is prevented, wherein electrolyte or acid absorption by the active material is facilitated, and longer life of the battery insured, and wherein a more rigid plate is provided although much more active material is carried thereby, and wherein a more uniform production of current is insured. Furthermore we are enabled by our construction to modify the size and form of our plate without loss of efficiency for various types and sizes of storage batteries, and any type of standard separator, spacer, or insulator may be used in conjunction with it. Our plate can be formed either positive or negative and we are enabled to provide a greater capacity or more active material per square inch of plate than others on the market with which we are acquainted.

Our plate combines the advantages of what is known as the "Plante" type of plate and the filled or pasted plate. The chief advantage of the "Plante" type lies in the fact that each complete cycle—or the operation of charge and discharge of the battery—finds the plate increasing in strength, but this type of plate has been found unsatisfactory for automobiles, whereas our plate may be used with any automobile battery, and the active material is protected and cannot be lost. Furthermore, our plate will supply current up to 1100 amperes if that be necessary and this is a great improvement over the "Plante" type of plate for the high starting current of approximately 425 amperes for the initial starting motor load cannot be reached by the "Plante" type of plate and accordingly they cannot be used for starters for automobiles.

Other and equally important objects and advantages of our invention may be briefly defined as follows; first, the elements of our plate can be quickly and cheaply cast in a common mold; second, ribs of antimony lead or other material are provided to stiffen and rigidify the structure of the plate; third, the plate and filling element includes but three parts which can be quickly assembled, and; fourth, our plates can be manufactured in quantities at relatively small cost, and assembled in any standard type of storage battery.

Other and equally important objects and advantages will become apparent as the description of our invention proceeds, but while we have in the present instance defined for the sake of illustration a specific form of our invention, it will be understood that we do not desire thereby to limit ourselves except as may be indicated by the scope of the claims appended hereto and forming a part of this specification.

In the drawings wherein we have illustrated our invention;—

Figure 1 is a perspective view of one section of our plate, herein called the "container" section for active material;

Figure 2 is a section taken on the line 2—2 of Figure 1;

Figure 3 is a plan view of our cover section, and

Figure 4 is a sectional view of a slight modification wherein the active material, lead oxide, is rolled out in the form of a sheet and inserted between the two sections.

In the drawings wherein like characters of reference are used throughout the several views to designate like or similar parts;—

The numeral (1) designates the container section of our plate which has a back (2) and flanges along its edges forming a top (3), bottom (4), and sides (5) providing a space (6) for containing active material, lead oxide or the like designated (7). In the space (6) and formed on the back (2) are ribs (8) and the back is slotted as at (9). The so called V-type of slots have been found to give satisfaction. The section (1) is preferably formed of antimony lead or other acid resisting material and can be cast in one piece in one operation.

The cover section (10) fits between the top (3) and bottom (4) and sides (5) of the section (1), and is welded, soldered, or braised or otherwise secured thereon to completed the assembly when the active material (7) has been placed in the space (6). The section (10) is slotted as at (11).

As shown in Figure 2 the active material (7) may be so placed in the space (6) as to extend through and into the slots (9) and

(11) filling them, in which case the lead oxide is applied in a plastic state and pressure exerted thereon, or on the plates (1) and (10) when they are assembled. Or in Figure 4 the lead oxide may be inserted in the space as a sheet, or the like, in which case it does not extend into the slots (9) and (11). Whereas we have stated above that the filler is lead oxide, and the plate body antimony lead, other materials may be used and the plate may be formed either positive or negative.

While it is believed that the manner of constructing, assembling, and operating our plate is believed to be apparent from the foregoing, it is pointed out that when the plates (1) and (10) are assembled the active material (7) is completely enclosed and protected in the space (6) although access of the electrolyte is had through the slots (9) and (11). Accordingly a greatly improved and highly desirable plate is provided wherein relatively more active material is carried by the plate and protected by its unique construction.

While in the foregoing there has been illustrated in the drawing and described in the specification such combination and arrangement of elements as constitute the preferred embodiments of our invention, it is nevertheless desired to emphasize the fact that interpretation of the invention should only be conclusive when made in the light of the subjoined claims.

We claim:—

1. A storage battery plate comprising a body having a section formed with flanged edges providing a chamber, an unflanged cover section seating between the flanged edges and secured thereto by uniting its edges to the flanged edges to close the chamber, active material in the chamber, and the respective sections being slotted to give access of the electrolyte to the active material.

2. A storage battery plate comprising an acid resisting body formed in sections, one section having lateral flanges along its edges providing an enclosed chamber for receiving active material therein, the other section receivable between the flanges to lie flush with the edge portions of the flanges and secured thereto by uniting its edges to the flanged portions to form a cover for the chamber, and both sections provided with slots giving access of electrolyte to the active material.

3. A storage battery plate comprising a rectangular body continuously flanged along its edges to form an enclosed chamber for receiving active material, spaced ribs formed on the body and extending part way into the chamber, a cover member for the chamber adapted to be received between the flanges flush with the edge portions of the flanges and secured thereto by uniting its edge portions with the flanges, and the body and cover provided with slots, communicating with the chamber to give access of electrolyte to the active material.

In testimony whereof, we affix our signatures hereunto.

RAYMOND T. MURRAY.
FRANK M. KELLY.